United States Patent
Mongillo, Jr. et al.

(10) Patent No.: US 10,584,596 B2
(45) Date of Patent: Mar. 10, 2020

(54) GAS TURBINE ENGINE COMPONENTS HAVING INTERNAL COOLING FEATURES

(71) Applicant: United Technologies Corporation, Farmington, CT (US)

(72) Inventors: Dominic J. Mongillo, Jr., West Hartford, CT (US); Allan N. Arisi, Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 136 days.

(21) Appl. No.: 15/852,400

(22) Filed: Dec. 22, 2017

(65) Prior Publication Data

US 2019/0195074 A1    Jun. 27, 2019

(51) Int. Cl.
*F01D 5/18*    (2006.01)
*F01D 25/12*    (2006.01)
(Continued)

(52) U.S. Cl.
CPC ............ *F01D 5/187* (2013.01); *F01D 25/12* (2013.01); *F23M 5/085* (2013.01); *F23R 3/005* (2013.01); *F01D 5/186* (2013.01); *F01D 5/188* (2013.01); *F01D 5/189* (2013.01); *F01D 9/065* (2013.01); *F05D 2220/32* (2013.01); *F05D 2240/11* (2013.01); *F05D 2240/35* (2013.01); *F05D 2260/202* (2013.01); *F05D 2260/22141* (2013.01); *F23R 2900/03043* (2013.01); *F23R 2900/03044* (2013.01)

(58) Field of Classification Search
CPC ... F01D 5/186–189; F01D 9/065; F01D 25/12
See application file for complete search history.

(56) References Cited

U.S. PATENT DOCUMENTS 4,773,593 A * 9/1988 Auxier .................... F01D 5/184
                                                        239/127.3
5,077,969 A * 1/1992 Liang ...................... F02K 1/822
                                                        60/757
(Continued)

FOREIGN PATENT DOCUMENTS

EP    1284338 A2    2/2003

OTHER PUBLICATIONS

European Search Report for European Application No. 18215396.5, International Filing Date Dec. 21, 2018, dated May 7, 2019, 9 pages.

*Primary Examiner* — Ninh H. Nguyen
*Assistant Examiner* — Behnoush Haghighian
(74) *Attorney, Agent, or Firm* — Cantor Colburn LLP (57) ABSTRACT

Components for gas turbine engines are provided. The components include a hybrid skin core cooling cavity defined by a cold wall and a hot wall, wherein the hot wall is exposed to an exterior environment of the component, a hybrid resupply hole formed in the cold wall and fluidly connecting a cold cavity and the hybrid skin core cooling cavity, and a resupply cover located on the cold wall and within the hybrid skin core cooling cavity and positioned relative to the hybrid resupply hole to shield resupply air injected from the cold cavity into the hybrid skin core cooling cavity to minimize losses as the resupply air mixes with air flowing within the hybrid skin core cooling cavity.

19 Claims, 10 Drawing Sheets

(51) Int. Cl.
*F23R 3/00* (2006.01)
*F23M 5/08* (2006.01)
*F01D 9/06* (2006.01)

(56) References Cited

U.S. PATENT DOCUMENTS

| | | | | |
|---|---|---|---|---|
| 5,383,766 A * | 1/1995 | Przirembel | ............ | F01D 5/186 416/92 |
| 5,419,039 A * | 5/1995 | Auxier | ............ | B23P 15/04 29/889.7 |
| 5,533,864 A * | 7/1996 | Nomoto | ............ | F01D 5/186 415/115 |
| 5,624,513 A * | 4/1997 | Desaulniers | ............ | B23P 6/002 156/247 |
| 5,702,232 A | 12/1997 | Moore | | |
| 5,816,777 A * | 10/1998 | Hall | ............ | F01D 5/189 416/97 R |
| 6,000,908 A * | 12/1999 | Bunker | ............ | F01D 5/189 165/908 |
| 7,520,723 B2 | 4/2009 | Liang | | |
| 8,083,485 B2 * | 12/2011 | Chon | ............ | F01D 5/187 416/97 R |
| 8,348,613 B2 * | 1/2013 | Gregg | ............ | F01D 5/189 415/1 |
| 8,480,366 B2 * | 7/2013 | Malecki | ............ | F01D 5/189 415/1 |
| 9,410,435 B2 | 8/2016 | Xu | | |
| 10,184,343 B2 * | 1/2019 | Lacy | ............ | F01D 5/189 |
| 2003/0031555 A1 * | 2/2003 | Noe | ............ | F01D 5/189 415/115 |
| 2006/0120869 A1 * | 6/2006 | Wilson | ............ | F01D 5/147 416/97 R |
| 2009/0246023 A1 * | 10/2009 | Chon | ............ | F01D 5/188 416/95 |
| 2013/0280091 A1 * | 10/2013 | Propheter-Hinckley | ............ | B22C 9/10 416/97 A |
| 2015/0226085 A1 * | 8/2015 | Spangler | ............ | F01D 25/12 60/806 |
| 2016/0032730 A1 * | 2/2016 | Thomen | ............ | F01D 5/187 415/115 |
| 2016/0076384 A1 | 3/2016 | Snyder et al. | | |
| 2016/0153285 A1 | 6/2016 | Ahmad et al. | | |
| 2016/0376896 A1 | 12/2016 | Spangler et al. | | |
| 2017/0234151 A1 * | 8/2017 | Spangler | ............ | F01D 5/188 415/115 |
| 2017/0335716 A1 * | 11/2017 | Bergholz | ............ | F01D 5/188 |
| 2018/0274369 A1 * | 9/2018 | Clum | ............ | F01D 5/147 |

\* cited by examiner

GAS TURBINE ENGINE COMPONENTS HAVING INTERNAL COOLING FEATURES

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external side walls. Such cooling cavities are subject to both hot material walls (exterior or external) and cold material walls (interior or internal). Although such cavities are designed for cooling portions of airfoil bodies, various cooling flow characteristics can cause hot sections where cooling may not be sufficient. Accordingly, improved means for providing cooling within an airfoil may be desirable.

BRIEF DESCRIPTION

According to some embodiments, components for gas turbine engines are provided. The components include a hybrid skin core cooling cavity defined by a cold wall and a hot wall, wherein the hot wall is exposed to an exterior environment of the component, a hybrid resupply hole formed in the cold wall and fluidly connecting a cold cavity and the hybrid skin core cooling cavity, and a resupply cover located on the cold wall and within the hybrid skin core cooling cavity and positioned relative to the hybrid resupply hole to shield resupply air injected from the cold cavity into the hybrid skin core cooling cavity to minimize losses as the resupply air mixes with air flowing within the hybrid skin core cooling cavity.

In addition to one or more of the features described herein, or as an alternative, further embodiments of the components may include that the hot wall is an exterior wall of an airfoil and the cold wall is an interior wall of the airfoil.

In addition to one or more of the features described herein, or as an alternative, further embodiments of the components may include that the cold wall is a wall of a baffle inserted into the airfoil.

In addition to one or more of the features described herein, or as an alternative, further embodiments of the components may include that the resupply cover partially covers the hybrid resupply hole.

In addition to one or more of the features described herein, or as an alternative, further embodiments of the components may include that resupply cover fully covers the hybrid resupply hole.

In addition to one or more of the features described herein, or as an alternative, further embodiments of the components may include that the hybrid skin core cooling cavity includes a plurality of heat transfer augmentation features.

In addition to one or more of the features described herein, or as an alternative, further embodiments of the components may include that the plurality of heat transfer augmentation features are formed on the hot wall of the hybrid skin core cooling cavity.

In addition to one or more of the features described herein, or as an alternative, further embodiments of the components may include that the resupply cover has a geometry that is the same as a geometry of at least one of the plurality of heat transfer augmentation features.

In addition to one or more of the features described herein, or as an alternative, further embodiments of the components may include that the resupply cover is integrally formed with the cold wall.

In addition to one or more of the features described herein, or as an alternative, further embodiments of the components may include that the cold wall comprises a plurality of resupply holes and a plurality of resupply covers, wherein each resupply hole is shielded by a respective resupply cover.

In addition to one or more of the features described herein, or as an alternative, further embodiments of the components may include that the resupply cover has a resupply cover height h and the hybrid skin core cooling cavity has a hybrid skin core cooling cavity height H, and wherein $0.01 \leq h/H \leq 0.5$.

According to some embodiments, gas turbine engines are provided. The gas turbine engines include a component having a hybrid skin core cooling cavity defined by a cold wall and a hot wall, wherein the hot wall is exposed to an exterior environment of the component, a hybrid resupply hole formed in the cold wall and fluidly connecting a cold cavity and the hybrid skin core cooling cavity, and a resupply cover located on the cold wall and within the hybrid skin core cooling cavity and positioned relative to the hybrid resupply hole to shield resupply air injected from the cold cavity into the hybrid skin core cooling cavity to minimize losses as the resupply air mixes with air flowing within the hybrid skin core cooling cavity.

In addition to one or more of the features described herein, or as an alternative, further embodiments of the gas turbine engines may include that the component is one of a blade, a vane, a blade outer air seal, or a combustor panel.

In addition to one or more of the features described herein, or as an alternative, further embodiments of the gas turbine engines may include that the hot wall is an exterior wall of an airfoil and the cold wall is an interior wall of the airfoil.

In addition to one or more of the features described herein, or as an alternative, further embodiments of the gas turbine engines may include that the cold wall is a wall of a baffle inserted into the airfoil.

In addition to one or more of the features described herein, or as an alternative, further embodiments of the gas turbine engines may include that the resupply cover one of partially covers the hybrid resupply hole and fully covers the hybrid resupply hole.

In addition to one or more of the features described herein, or as an alternative, further embodiments of the gas turbine engines may include that the hybrid skin core cooling cavity includes a plurality of heat transfer augmentation features.

In addition to one or more of the features described herein, or as an alternative, further embodiments of the gas turbine engines may include that the resupply cover has a geometry that is the same as a geometry of at least one of the plurality of heat transfer augmentation features.

In addition to one or more of the features described herein, or as an alternative, further embodiments of the gas turbine engines may include that the resupply cover has a resupply cover height h and the hybrid skin core cooling cavity has hybrid skin core cooling cavity height H, and wherein $0.01 \leq h/H \leq 0.5$.

In addition to one or more of the features described herein, or as an alternative, further embodiments of the gas turbine engines may include that the hot wall is an exterior wall of an airfoil, the cold wall is an interior wall of the airfoil, and the exterior environment is a gas path of the gas turbine engine.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
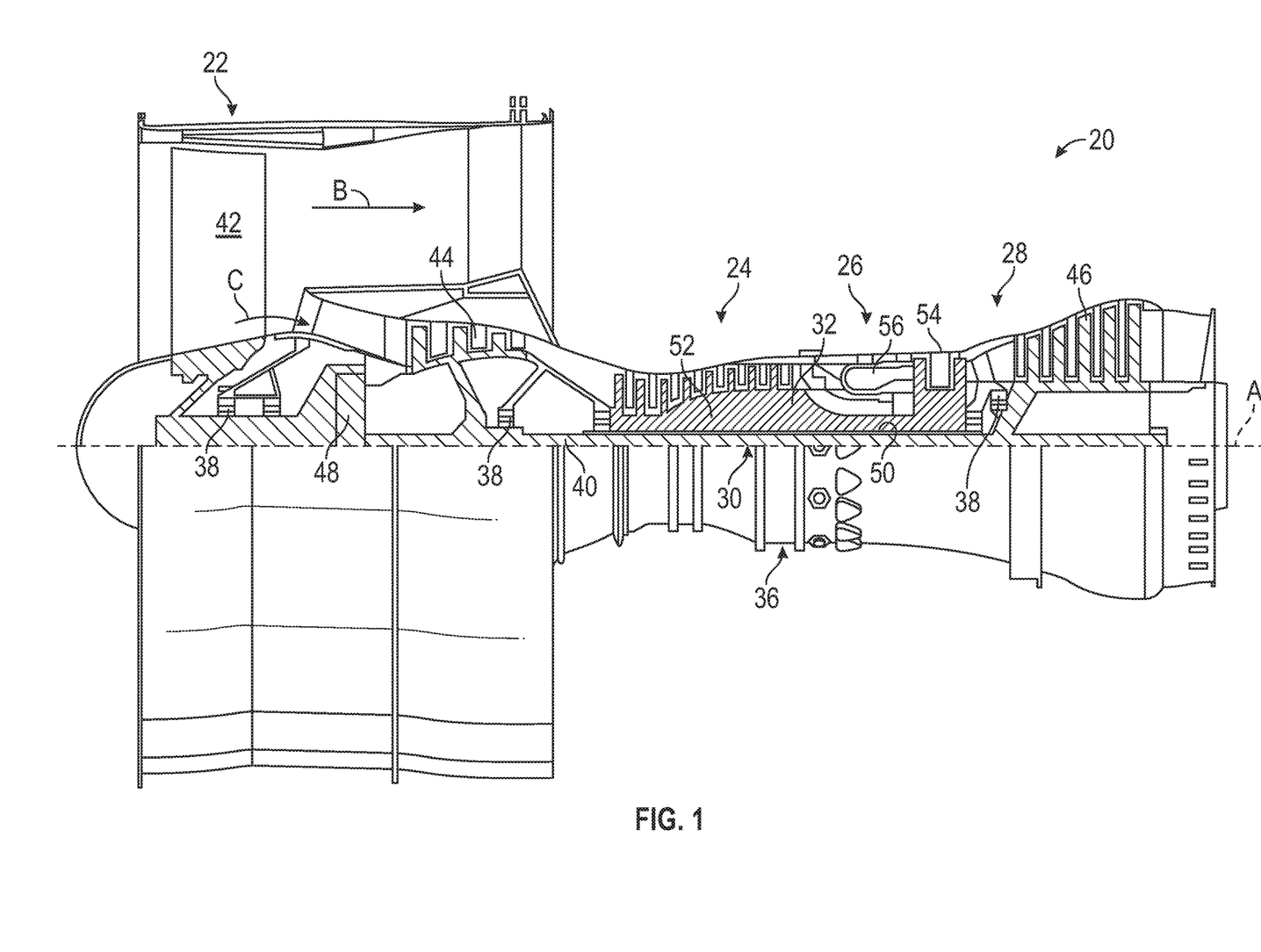
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(514.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
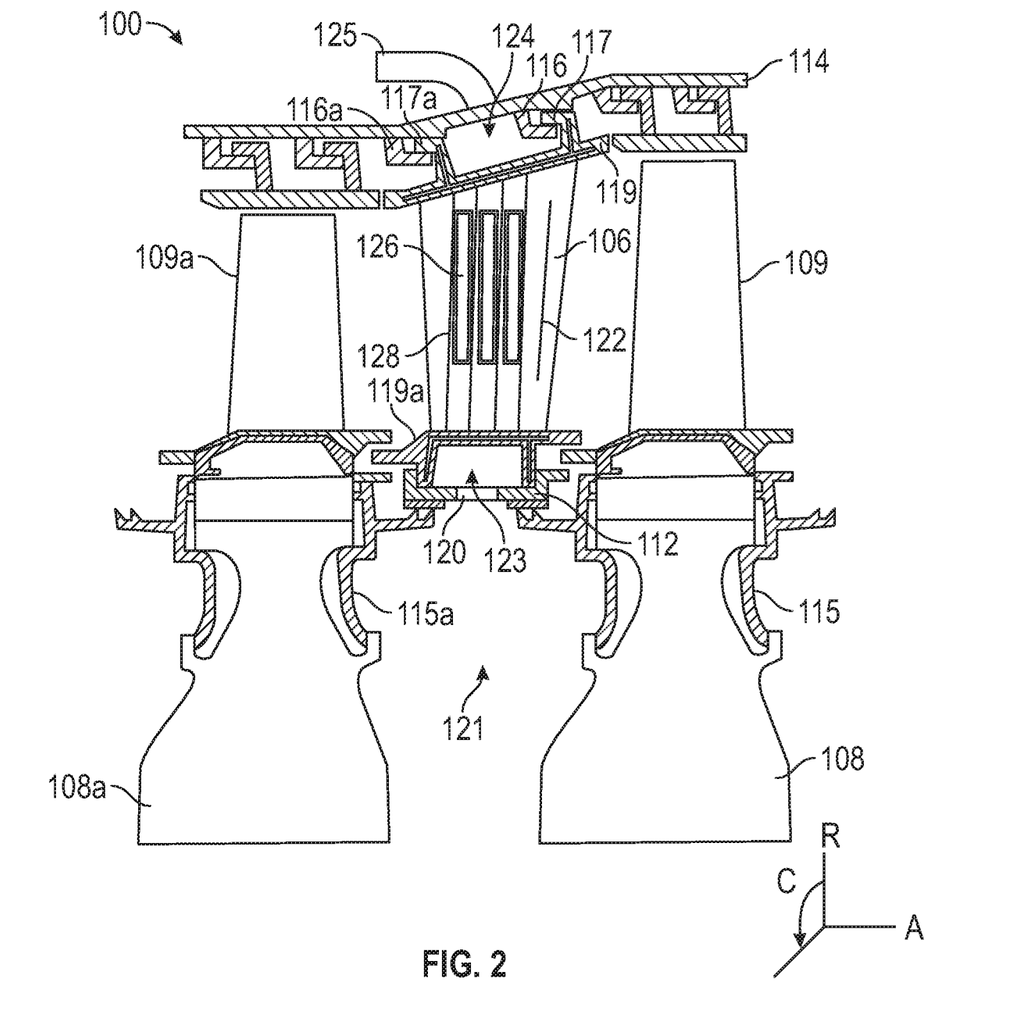
FIG. 2 is a schematic illustration of a portion of a turbine section of the gas turbine engine of FIG. 1.

Referring now to FIG. 2, a cooling design in a turbine section 28 for a gas turbine engine 20 may utilize a vane 106 disposed between axially adjacent bladed full hoop disks 108, 108a having respective blades 109, 109a. As shown, vane 106 is disposed radially between an inner air seal 112 and a full hoop case 114 on an outer side. Inner air seal 112 may be a full hoop structure supported by opposing vanes, including a plurality of vanes 106 that are separated in a circumferential direction. Vane 106 is supported by the full hoop case 114 through segmented vane hooks 117, 117a. One or more full hoop cover plates 115, 115a may minimize leakage between the vane 106 and the blades 109, 109a. The vane 106 is radially supported by the full hoop case 114 with segmented case hooks 116, 116a in mechanical connection with the segmented vane hooks 117, 117a. The vane 106 may be circumferentially supported between circumferentially adjacent vanes by feather seals 119, 119a that can minimize leakage between the adjacent vanes 106 into the gas path.

A turbine cooling air (TCA) conduit 125 provides cooling air into an outer diameter vane cavity 124. The vane 106 is hollow so that air can travel radially into and longitudinally downstream through the vane 106 via one or more vane cavities 122, and thereafter into a vane inner diameter cavity 123. Thereafter air may travel through an orifice 120 in the inner air seal 112 and into a rotor cavity 121.

It is to be appreciated that the longitudinal orientation of vane 106 is illustrated in a radial direction, but other orientations for vane 106 are within the scope of the disclosure. In such alternate vane orientations, fluid such as cooling air can flow into the vane cavity 122 through an upstream opening illustrated herein as outer diameter cavity 124 and out through a downstream opening in vane cavity 122 illustrated herein as inner diameter cavity 123. A longitudinal span of vane cavity 122 being between such openings.

The vane 106, as shown, includes one or more baffles 126 located within the vane 106. The baffles 126 are positioned within one or more respective baffle cavities 128. The baffle cavities 128 are sub-portions or sub-cavities of the vane cavity 122. In some embodiments, such as shown in FIG. 2, the baffle cavities 128 are internal cavities that are axially inward from the leading and trailing edges of the vane 106, although such arrangement is not to be limiting.

As shown and labeled in FIG. 2, a radial direction R is upward on the page (e.g., radial with respect to an engine axis) and an axial direction A is to the right on the page (e.g., along an engine axis). Thus, radial cooling flows will travel up or down on the page and axial flows will travel left-to-right (or vice versa). A circumferential direction C is a direction into and out of the page about the engine axis.

Figure 3A:
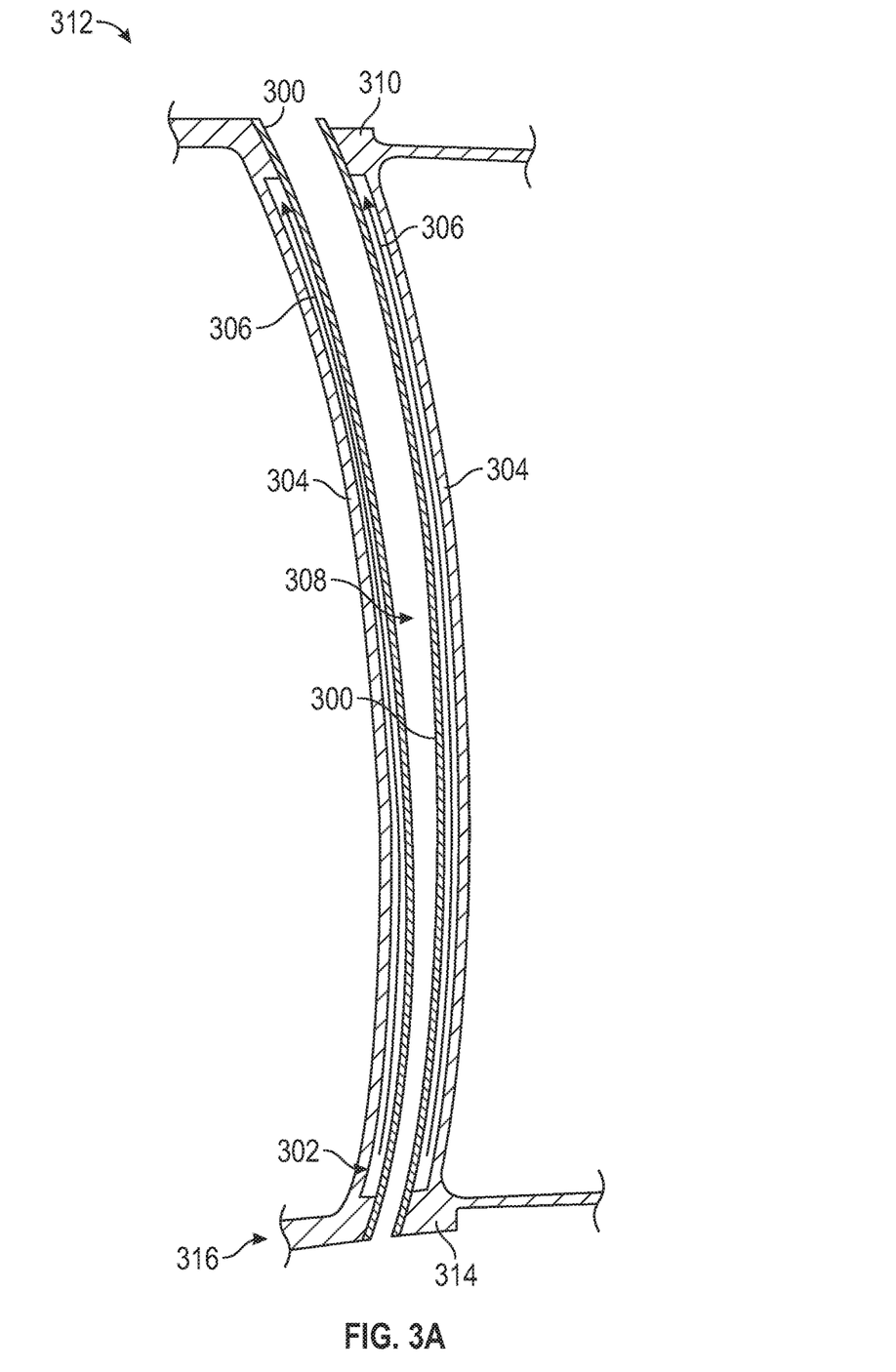
FIG. 3A is a schematic illustration of an airfoil having a baffle installed therein that can incorporate embodiments of the present disclosure.

Turning now to FIG. 3A, a baffle 300 is positioned within an airfoil cavity 302 of and airfoil 304, such as a vane. In operation, air flows within the airfoil cavity 302 of the airfoil 304 along an airflow path 306, indicated by the arrows in FIG. 3A, to provide cooling to the airfoil 304. Further, in some arrangements, cooling air can flow within and/or through a baffle cavity 308 within the baffle 300.

As shown in FIG. 3A, the baffle 300 abuts against an outer platform 310 at an outer diameter 312 and against an inner platform 314 at an inner diameter 316. The positioning of the baffle 300 at the inner and outer diameters 312, 316 may be to appropriately position and secure the baffle 300 in place and also to provide a seal at the turn between adjacent airfoil cavities 302. As shown, the baffle 300 extends between the outer diameter 312 and the inner diameter 316. As such, the baffle 300 is a full-length baffle that can be arranged to provide thermal and/or flow control by controlling the airflow 306 adjacent a hot exterior wall of the airfoil 304. Such control can result in high Mach numbers and heat transfer coefficients across the entire airfoil 304, extending between the inner diameter 316 to the outer diameter 312. Because the baffle 300 extends the full length of the airfoil 304, the cooling may be too high or efficient at certain locations within the airfoil 304. This may result in unnecessary pressure loss and heat-up of the airflow 306 thereby reducing the cooling potential of the air which subsequently makes it more difficult to cool other portions of the airfoil 304. Accordingly, the end result may be a non-uniform temperature within the airfoil 304. Although shown with the baffle being open at both the top and the bottom (FIG. 2), the outer diameter portion of the baffle and/or the inner diameter portion of the baffle may be capped or sealed, as will be appreciated by those of skill in the art. Further, although shown with the baffle extending a full radial length of the airfoil 304, those of skill in the art will appreciate that baffles as described herein are not limiting, and that partial baffles (extending less than a full length of the airfoil) may be incorporated into embodiments described herein.

In some embodiments, the baffle 300 can provide a double-wall cooling design, wherein a portion of the cooling air within the baffle cavity 308 can be bled into the airfoil cavity 302 to impinge upon interior surfaces of the airfoil 304 and/or to provide a resupply of cooling air within the airfoil cavity 302.

Although shown in FIG. 2 as a baffle insert arrangement, embodiments provided herein can be enabled with a double-wall (i.e., walls of an airfoil) configurations. That is, in some embodiments, the structure of the baffle 300 shown in FIG. 3A can represent an integral internal wall or walls of the airfoil 304 such that the airfoil 304 includes internal (cold) cavities and/or peripheral micro cooling channels (hybrid skin core cooling cavities). Accordingly, with reference to FIG. 3A, the airfoil cavities 302 can be hybrid skin core cooling cavities with an external hot wall that is exposed to a hot gaspath and the baffle cavity 308 may be an internal cold cavity that is bounded by walls that are not exposed to the hot gaspath. As used herein, the term "hybrid" when referring to a skin core cooling cavity of an airfoil or other gas turbine engine component is a cavity with a double-walled cooling channel having one wall exposed to a hot temperature fluid and the other wall not exposed to the hot temperature fluid. Thus, the hybrid skin core cooling cavities of the present disclosure can be double-walled flow channels/cavities within airfoils (blades, vanes), blade outer air seals, combustor panels, etc. and the present disclosure is not to be limited to the various specific embodiments shown and described herein.

Figure 3B:
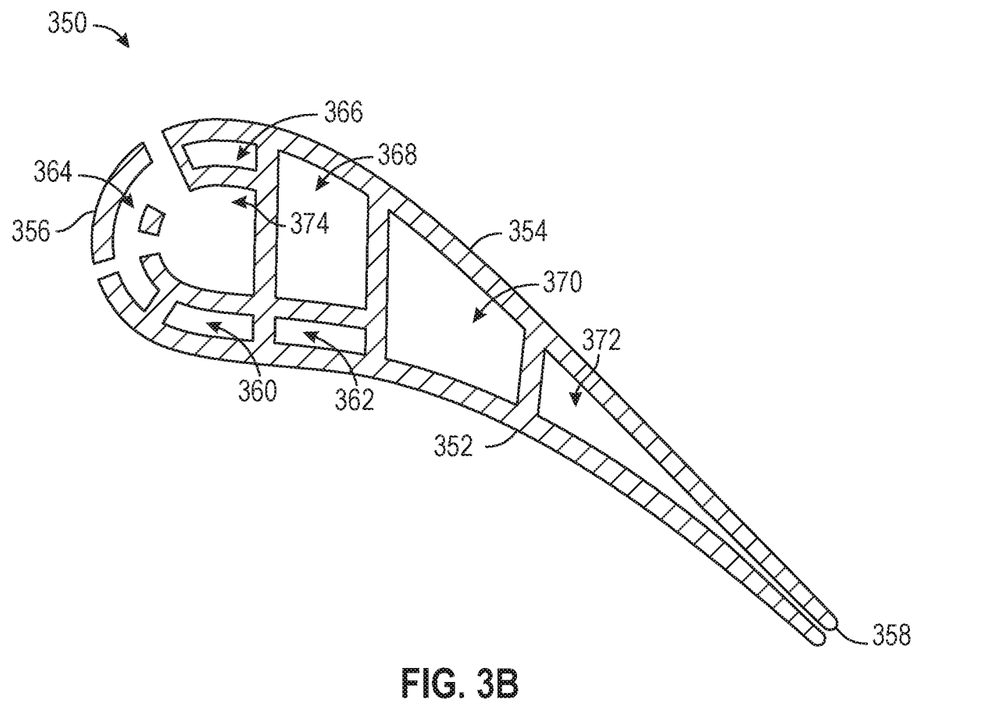
FIG. 3B is a schematic illustration of an airfoil having an interior structure forming hybrid skin core that can incorporate embodiments of the present disclosure.

Turning now to FIG. 3B, an airfoil 350 includes an airfoil body having a pressure side 352, a suction side 354, a leading edge 356, and a trailing edge 358. The pressure side 352 is disposed opposite the suction side 354, with each side extending radially from a root region to a tip region, as will be appreciated by those of skill in the art. The airfoil 350 may be a blade or vane, and have various other features associated with such configurations, e.g., platforms, tip surfaces, etc. As shown in FIG. 3B, the airfoil 350 includes a plurality of internal cavities to enable cooling of the airfoil 350. As shown, the airfoil 350 includes a plurality of forward and side hybrid cooling channel cavities 360, 362, 364, 366 immediately proximate an external hot wall surface of the airfoil 350. The airfoil 350 includes additional cooling cavities, including, as shown, various serpentine flow cavities 368, 370, 372 and a leading edge feed cavity 374.

The hybrid cooling channel cavities 360, 362, 364, 366 are each defined by having an external hot wall and an internal cold wall. For example, the a first pressure side hybrid cooling channel cavity 360 has a hot external wall defined in part by the pressure side 352 of the airfoil 350 and a cold internal wall defined by a wall that defines, in part, the leading edge feed cavity 374. A second pressure side hybrid cooling channel cavity 362 has a hot external wall defined in part by the pressure side 352 of the airfoil 350 and a cold internal wall defined by a wall that defines, in part, a first serpentine cavity 368. A leading edge hybrid cooling channel cavity 364 has a hot external wall defined in part by the leading edge 356 of the airfoil 350 and a cold internal wall defined by a wall that defines, in part, the leading edge feed cavity 374. A suction side hybrid cooling channel cavity 366 has a hot external wall defined in part by the suction side 354 of the airfoil 350 and a cold internal wall defined by a wall that defines, in part, the leading edge feed cavity 374.

As shown and described, the hybrid cooling channel cavities are hybrid cavities that include both hot walls and cold walls. Although shown with a specific internal cooling cavity arrangement, airfoils in accordance with the present disclosure may include additional and/or alternative cavities, flow paths, channels, etc. as will be appreciated by those of skill in the art, including, but not limited to, tip cavities, serpentine cavities, trailing edge cavities, etc.

Advanced double-wall cooling design configurations, either in the form of baffles (FIG. 3A) and/or hybrid cooling channel cavities adjacent to external airfoil surfaces (FIG. 3B), can be used to mitigate cooling flow requirements for high heat load applications in order to achieve performance and durability life requirements. Further, such baffle and/or hybrid skin core cooling cavity configurations can be utilized in airfoil cooling design configurations that are allocated low levels of cooling flow. In the case of first and second stage high-pressure turbine vane, baffles can be incorporated to reduce cooling channel flow area by creating a gap between the baffle surface and the internal surface of the airfoil hot wall, effectively creating a hybrid cooling channel. The flow direction of the hybrid channel formed between the baffle and the internal surface of the airfoil hot wall may be oriented in axial and/or radial flow directions. As noted above, the hybrid skin core cooling channels formed between the baffle and the airfoil external wall are similar to a cast double-wall cooling design concept of an airfoil that incorporates hybrid skin core cooling channel cavities. The primary difference, however, is that in a double-wall cooling design concept, the internal cold wall and riblet design features serve as a heat sink by providing a conductive path for the hot exterior wall to dissipate heat and more effectively reduce hot local exterior wall metal temperatures.

The small cavity cross-sectional flow area associated with hybrid skin core cooling cavities enables a relatively high flow per unit area to be achieved, while producing higher internal convective heat transfer along a roughened hot external airfoil wall (e.g., inclusion of turbulators and/or other thermal transfer augmentation features). While the high flow per unit area hybrid skin core cooling passage flows can produce high internal convective heat transfer resulting in increased local thermal cooling effectiveness and part oxidation capability, adverse consequences due to excessive pressure loss and cooling air temperature heat pickup can reduce the local cooling potential as a function of hydraulic diameter and distance along the low aspect ratio channel or hybrid skin core cooling cavity immediately adjacent to the hot exterior airfoil wall. For example, a hybrid skin core cooling cavity has a length L being a length along the hot or cold wall of the hybrid skin core cooling cavity (e.g., axial or chord-wise direction relative to the airfoil) and a hydraulic diameter $D_h$ that is a distance or length between the hot wall and the cold wall of the hybrid skin core cooling cavity (e.g., circumferential direction with respect to the airfoil). In some situations, the length-to-hydraulic diameter ratio $L/D_h$ of the hybrid cavities can be excessively high, e.g., $L/D_h > 10$. Such hybrid cavities may be referred to herein as "micro" channels or "hybrid cooling micro channel cavities."

In convectively cooled hybrid cooling channel cavities, the internal cooling flow has a development flow length, $L/D_h$, in which the internal convective heat transfer increases to a maximum convective heat transfer augmentation level. Once the internal cooling flow in the hybrid skin core cooling channel cavity is fully developed, the internal convective heat transfer augmentation begins to decrease monotonically as a function of $L/D_h$ for the remainder of the hybrid skin core cooling channel length. As a result of the high internal cavity Reynolds Number and convective heat transfer within the hybrid skin core cooling channel there may be a significant amount of frictional pressure loss and cooling air heat pickup that occurs, resulting in excessive increase in cooling air temperature heat up. Both of these effects can adversely impact the local thermal cooling capacity of the hybrid skin core cooling channels.

In order to mitigate the effects of excessive pressure loss and cooling air temperature heat pickup it becomes desirable to mitigate the internal flow characteristics that adversely impact the local convective cooling effectiveness that occurs in a long $L/D_h$ hybrid skin core cooling channel cavities. In accordance with embodiments of the present disclosure, mitigation for reductions in convective heat transfer augmentation resulting from fully developed flow, excessive pressure loss, and cooling air temperature heat pickup in high $L/D_h$ hybrid skin core cooling channels can be achieved through the incorporation covered and/or partially covered resupply features. The covered and/or partially covered resupply features, in accordance with the present disclosure, are designed to orient and align a resupply flow from a resupply source (e.g., internal cold cavity, baffle cavity, etc.) with the flow within the hybrid skin core cooling cavity, thus minimizing momentum mixing losses. In some embodiments of the present disclosure, the resupply features may be periodically located directly into the hybrid skin core cooling channel cavities in order to provide higher pressure and colder cooling air in order to sustain a high level of thermal cooling effectiveness along the entire length of the micro cooling channel and/or hybrid skin core cooling channel cavity.

Figure 4:
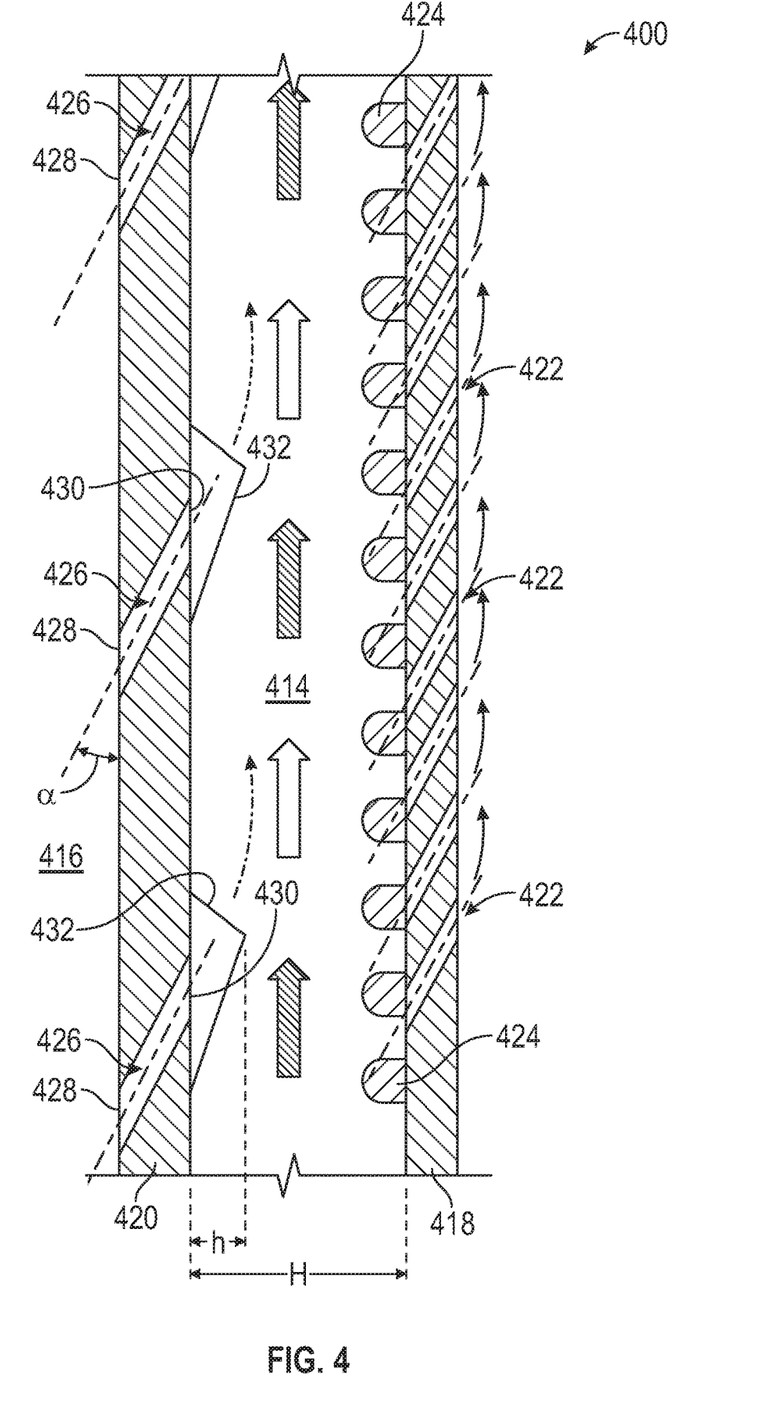
FIG. 4 is a schematic illustration of a portion of a component incorporating an embodiment of the present disclosure.

Turning now to FIG. 4, a partial schematic illustration of a component 400 in accordance with an embodiment of the present disclosure is shown. The component 400 includes a hybrid skin core cooling cavity 414 located between an exterior hot wall 418 and an interior cold wall 420. The hybrid skin core cooling cavity 414 shown in FIG. 4 may be representative of one or more of the hybrid cooling channel cavities 360, 362, 364, 366 shown in FIG. 3B. The exterior hot wall 418 is an external wall or surface of the component 400 that is exposed to hot gaspath air and the interior cold wall 420 is a wall defining a cold cavity 416, e.g., as shown in FIG. 3B. In alternative embodiments, the interior cold wall 420 may be representative of a wall of a baffle having an internal cavity. Thus, in some embodiments, the cold wall 420 is a wall of a baffle, such as shown in FIG. 3A. As shown in FIG. 4 and described herein, various cooling features are formed or arranged relative to the hybrid skin core cooling cavity 414, such as within and/or on the hot and cold walls 418, 420.

For example, as shown, the hot wall 418 includes a plurality of film cooling holes 422 which are arranged to direct air from within the hybrid skin core cooling cavity 414 into the gas path and to form a film of air on the exterior surface of the hot wall 418. Further, as shown, the hot wall 418 can include various heat transfer augmentation features 424, such as trip strips, turbulators, pin fins, etc. It is to be understood that the trip strip orientation, spacing (pitch), and height are dependent upon the required convective heat transfer augmentation necessary to achieve the desired local thermal cooling effectiveness levels in order to meet metal temperature and durability life requirements.

The hybrid skin core cooling cavity 414 is resupplied with cool air from the cold cavity 416 through a plurality of hybrid resupply holes 426. Each hybrid resupply hole 426 extends from an inlet 428 to an outlet 430, with the inlet 428 being open to the cold cavity 416 and the outlet 430 being open to the hybrid skin core cooling cavity 414. As shown, the hybrid resupply holes 426 may be angled relative to the cold wall 420 at an injection angle α. In some embodiments, the injection angle α may be between 5° and 45°. The injection angle α may be selected to achieve low momentum mixing between the resupply air provided from the cold cavity 416 and the air within the hybrid skin core cooling cavity 414. The injection angle α is an angle for injection of resupply air passing from the cold cavity 416, through the hybrid resupply hole 426, and into the hybrid skin core cooling cavity 414 such that the injected air is directed, at least partially, parallel to a direction of flow within the hybrid skin core cooling cavity 414.

Those of skill in the art will appreciate that, although the resupply features depicted in FIG. 4 may be of cylindrical shape, the shape of the resupply geometry feature may be of any desirable geometries, including, but not limited to, conical, oval, and/or elliptical geometric surfaces of varying curvature. The resupply features may also have multi-faceted linear and/or curvilinear surfaces having one or more inflection points.

To aid in the reduction of losses as the resupply air is injected into the hybrid skin core cooling cavity 414, the cold wall 420 can be provided with one or more resupply covers 432. The resupply covers 432 are positioned within the hybrid skin core cooling cavity 414 and cover or partially cover the outlets 430 of the hybrid resupply holes 426. The resupply covers 432, as shown, protrude from the cold wall 420 (i.e., internal airfoil cold wall or baffle wall) and operate as a conduit for directing cooling flow to be injected in a streamwise direction directly into the hybrid skin core cooling cavity 414 formed between the interior cold wall 420 and the exterior hot wall 418.

As shown in FIG. 4, a resupply cover height h of the resupply covers 432 from the interior cold wall 420 (or baffle wall) may be a function of the total hybrid skin core cooling cavity height H. For example, where the ratio h/H of the resupply cover height h of the resupply covers 432 to the hybrid skin core cooling channel height H may range from $0.01 \leq h/H \leq 0.5$. In this sense, the covered resupply height h and the hybrid skin core cooling cavity height H may vary along the streamwise direction of the internal cooling flow. Therefore, in some embodiments, the ratio h/H of the resupply cover height h and hybrid skin core cooling cavity height H may be of constant proportions or of varying proportions as a function of the local airfoil or hot section component geometric, convective heat transfer, pressure loss, and cooling flow requirements.

The resupply covers can take various geometric shapes and/or configurations, and in some embodiments, resemble a cheese grater, although other shapes, sizes, orientations, etc., can be arranged to provide cooling flow injection optimization. The streamwise and lateral spacing of the resupply covers can be dependent upon cooling flow and local thermal cooling effectiveness requirements. Further, in some embodiments, every resupply hole can be arranged with a resupply cover and in other embodiments, a sub-set of the resupply holes can be configured with a resupply cover. Moreover, various covered and/or partial covered resupply geometries of varying shapes and sizes may co-exist or be integrated concurrently within the same hybrid skin core cooling cavity and/or segregated amongst individual or unique hybrid skin core cooling cavities within the same airfoil or hot section engine component.

The unique shapes of the resupply covers and relative orientation to the cooling flow within the hybrid skin core cooling cavity can be dependent, in some embodiments, upon the heat transfer augmentation features (e.g., turbulators, trip strips, etc.) and the geometries thereof. For example, heat transfer augmentation features geometries can include, but are not limited to, normal, skewed, segmented skewed, single chevron, segmented chevron, w-shaped, etc., and/or may include pin fins, pedestals, dimples, etc. Accordingly, such different geometric arrangements of the heat transfer augmentation features may require unique geometric shapes, orientations, and injection angles of the resupply holes and/or the resupply covers in order to minimize momentum mixing losses between the injected resupply flow and the main cooling flow within the hybrid skin core cooling cavity.

Figure 5:
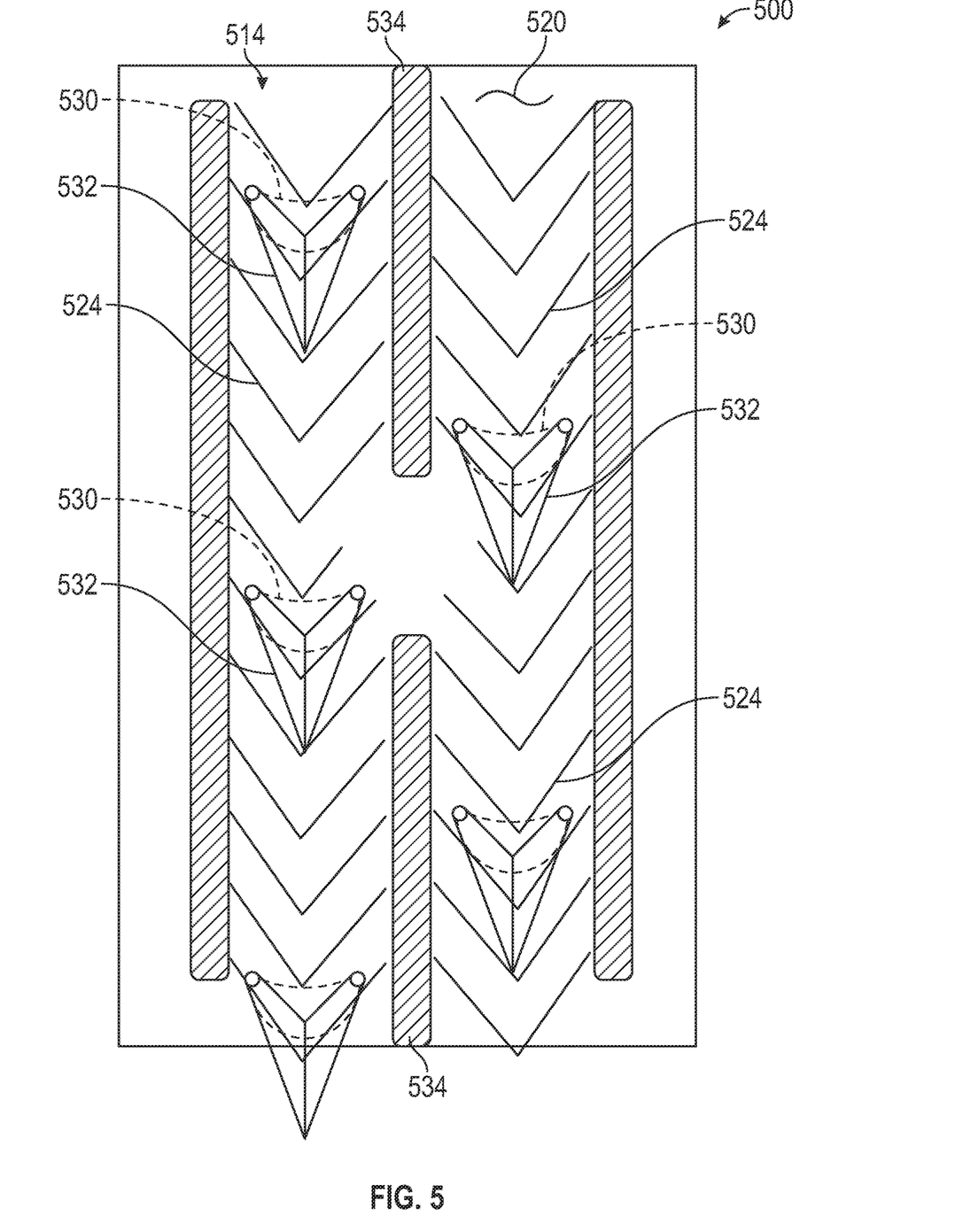
FIG. 5 is a schematic illustration of a portion of a component incorporating an embodiment of the present disclosure.

Turning now to FIG. 5, a schematic illustration of a hybrid skin core cooling cavity 514 of a component 500 is shown. In the illustration of FIG. 5, the view is a partial schematic elevation view of a cold wall 520 of the component 500 that includes a plurality of hybrid resupply holes with outlets 530 opening into the hybrid skin core cooling cavity 514. In this illustration, the hybrid skin core cooling cavity 514 is divided into two sub-cavities by a plurality of radially extending ribs 534, which as shown are segmented ribs. Also illustratively shown are heat transfer augmentation features 524 which are located on a hot wall of the component 500. As shown, the heat transfer augmentation features 524 are chevron shaped.

The outlets 530 of the hybrid resupply holes are partially covered by resupply covers 532. As shown, the resupply covers 532 are shaped such that a portion of the resupply covers 532 matches or corresponds to the geometry of the heat transfer augmentation features 524 (i.e., a portion of the resupply covers 532 is chevron shaped at the location partially covering the outlets 530). As such, the geometries of the resupply covers 532 and the heat transfer augmentation features 524 may have the same or substantially similar geometries. Also shown, the resupply covers 532 have a geometric profile extending in a flow direction that is selected to minimize losses as resupply air is injected through the resupply holes and into the hybrid skin core cooling cavity 514. Although shown with a specific shape and geometry, those of skill in the art will appreciate that the resupply covers can take various shapes, sizes, geometries, orientations, etc. without departing from the scope of the present disclosure.

Figures 6, 7:
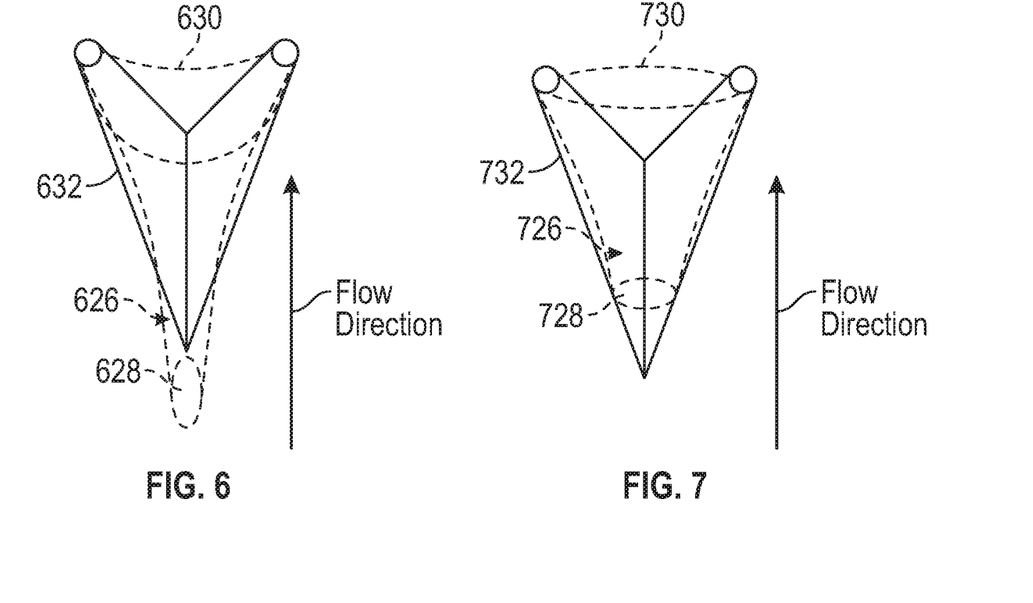
FIG. 6 is a schematic illustration of a resupply cover in accordance with an embodiment of the present disclosure.
FIG. 7 is a schematic illustration of a resupply cover in accordance with an embodiment of the present disclosure.
Figures 8, 9:
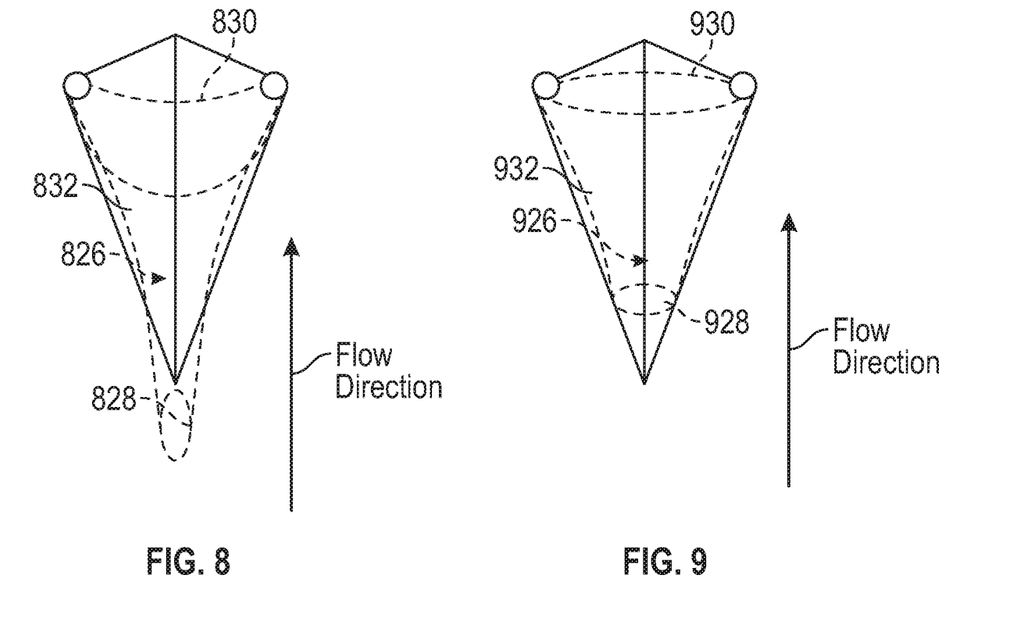
FIG. 8 is a schematic illustration of a resupply cover in accordance with an embodiment of the present disclosure.
FIG. 9 is a schematic illustration of a resupply cover in accordance with an embodiment of the present disclosure.

For example, turning now to FIGS. 6-9, various schematic illustrations of resupply covers in accordance with embodiments of the present disclosure are shown. FIGS. 6-7 illustrate partially-covering resupply covers 632, 732 positioned over resupply holes 626, 726. FIGS. 8-9 illustrate fully-covering resupply covers 832, 932 positioned over resupply holes 826, 926.

In FIGS. 6-7, the resupply holes 626, 726 extend through a cold wall (not shown) from an inlet 628, 728 to an outlet 630, 730. As shown, the resupply covers 632, 732 partially cover the outlets 630, 730 and protect or cover the outlets 630, 730 from a flow of air that is passing through a hybrid skin core cooling cavity in a flow direction. That is, the resupply covers 632, 732 prevent or minimize losses that may occur when resupply air flows through the resupply holes 626, 726 and is injected into the hybrid skin core cooling cavity. As shown in FIGS. 6-7, the resupply holes 626, 726 may have different geometries and/or lengths within the cold wall, and the resupply covers 632, 732 may be configured to appropriately cover the outlets 630, 730 to achieve a desired flow property for the injected resupply air and/or the mixing of the resupply air and the air already flowing within the hybrid skin core cooling cavity.

Similarly, in FIGS. 8-9, the resupply holes 826, 926 extend through a cold wall (not show) from an inlet 828, 928 to an outlet 830, 930. As shown, the resupply covers 832, 932 fully cover the outlets 830, 930 and protect or cover the outlets 830, 930 from a flow of air that is passing through a hybrid skin core cooling cavity in a flow direction. That is, the resupply covers 832, 932 prevent or minimize losses that may occur when resupply air flows through the resupply holes 826, 926 and is injected into the hybrid skin core cooling cavity. As shown in FIGS. 8-9, the resupply holes 826, 926 may have different geometries and/or lengths within the cold wall, and the resupply covers 832, 932 may be configured to appropriately cover the outlets 830, 930 to achieve a desired flow property for the injected resupply air and/or the mixing of the resupply air and the air already flowing within the hybrid skin core cooling cavity.

Figure 10A:
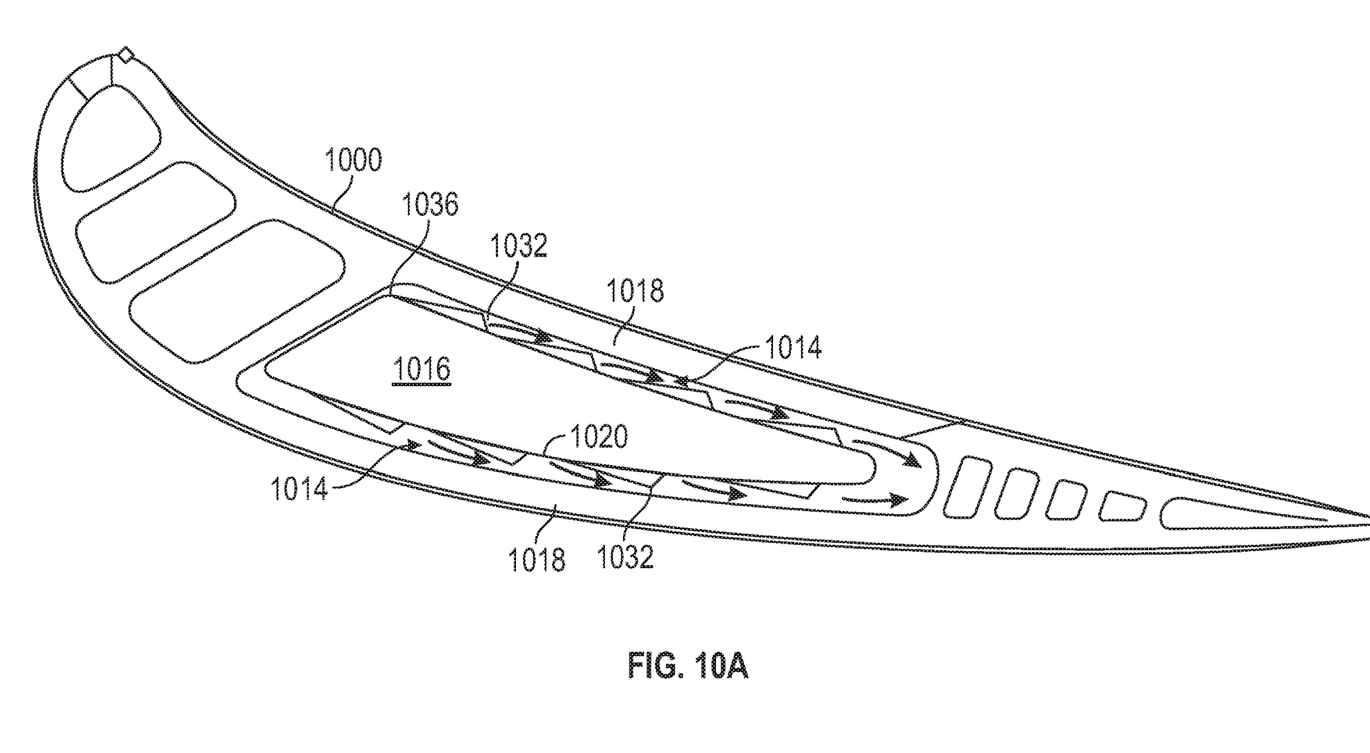
FIG. 10A is a top-down cross-sectional illustration showing internal geometry of an airfoil incorporating an embodiment of the present disclosure.
Figure 10B:
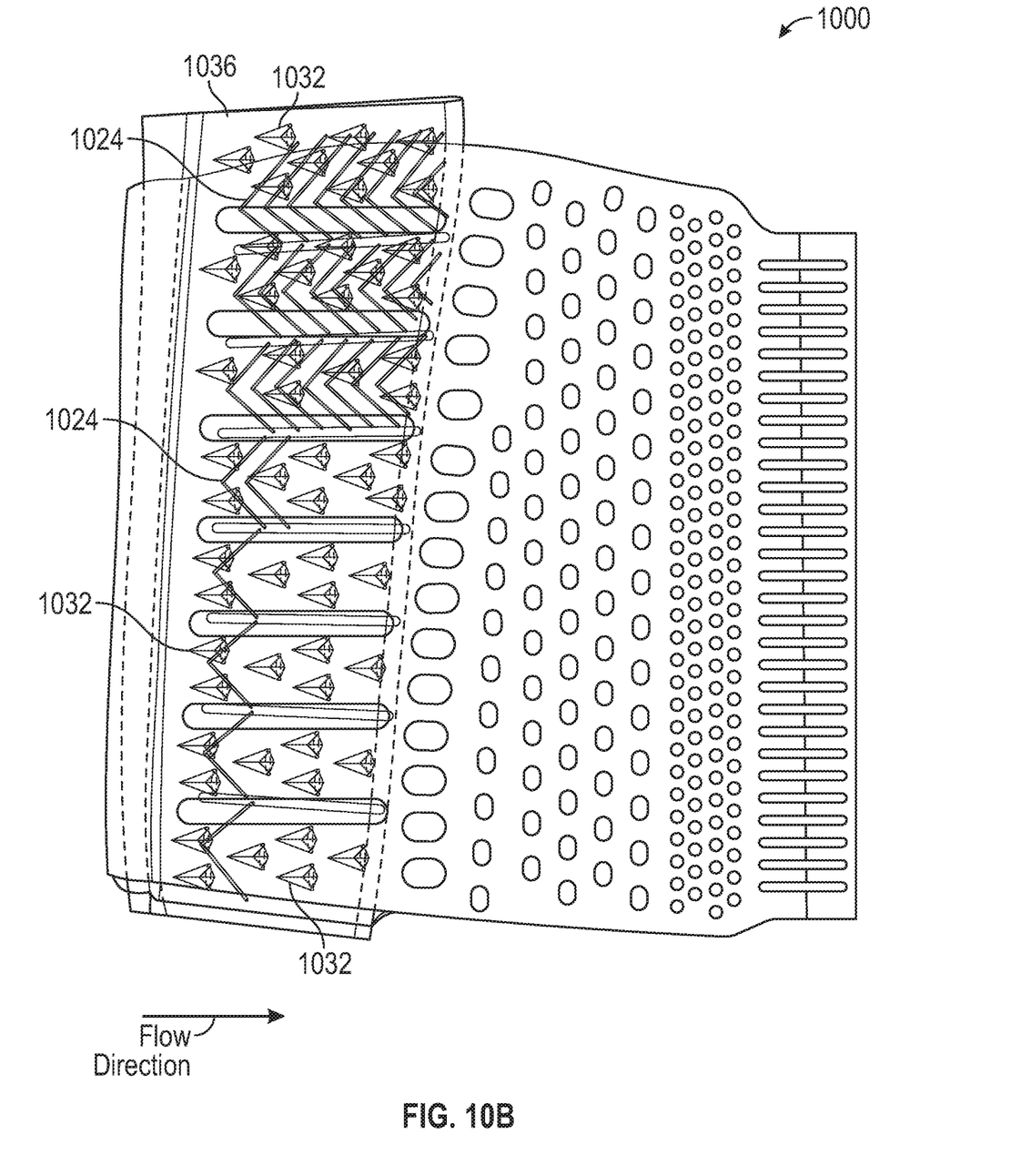
FIG. 10B is a side elevation partial illustration of the airfoil of FIG. 10A.

Turning now to FIGS. 10A-10B, schematic illustrations of an airfoil 1000 having a baffle 1036 installed therein are shown. FIG. 10A is a top-down cross-sectional illustration showing internal geometry of the airfoil 1000 and FIG. 10B is a side elevation partial illustration of the airfoil 1000 with the baffle 1036 installed therein.

As shown in FIG. 10A, the baffle 1036 is installed within an internal cavity of the airfoil 1000, as will be appreciated by those of skill in the art. The baffle 1036 causes a hybrid skin core cooling cavity 1014 to be formed between the baffle 1036 and an external hot wall 1018 of the airfoil 1000. The walls of the baffle 1036 form a cold wall 1020 with a cold cavity 1016 defined within the baffle 1036. As such, the hybrid skin core cooling cavity 1014 is formed between the cold wall 1020 of the baffle 1036 and the hot wall 1018 of the airfoil 1000, similar to that shown and described above. Cooling air from within the cold cavity 1016 (e.g., a baffle cavity) can be resupplied into the hybrid skin core cooling cavity 1014. The resupplied air is injected through one or more resupply holes, similar to that shown and described above. The resupply holes are covered by resupply covers 1032, as shown in FIGS. 10A-10B. As shown in FIG. 10B, the resupply covers 1032 can be distributed on the baffle 1036 for a full radial extent of the baffle 1036 (when installed within the airfoil 1000). A general flow direction (aftward) within the hybrid skin core cooling cavity 1014 is shown in FIG. 10B. Because the cooling air within the hybrid skin core cooling cavity 1014 flows generally axially aftward, the resupply covers 1032 are oriented to shield or protect the injected cooling air from the cold cavity 1016 as the resupply air is injected in a predominantly aftward direction (i.e., in a flow or streamwise direction). As shown, the airfoil 1000 can include heat transfer augmentation features 1024, which in this arrangement are oriented in an axially aftward flow direction. The internal augmentation features formed along the internal surface of the exterior hot wall may be of various geometry types, including, but not limited to, normal, skewed, segmented skewed, chevron, segmented chevron, w-shaped, discrete w-shaped trip strip orientations, turbulators, pin fins, dimple arrays, etc.

Although FIG. 10A is described above as an illustration of an airfoil with a baffle inserted or installed therein, such illustration description is not to be limiting. For example, in an alternative embodiment of the present disclosure, FIG. 10A is representative of an airfoil manufactured using various techniques such that the element 1036 is integrally formed with the airfoil during the manufacturing process. As such, the element 1036 may be an interior structural wall of the airfoil such that the hybrid skin core cooling cavity 1014 is formed similar to that shown in structure in FIG. 3B. Such manufacturing techniques can include, but is not limited to, additive manufacturing and fugitive core processes.

Figure 11:
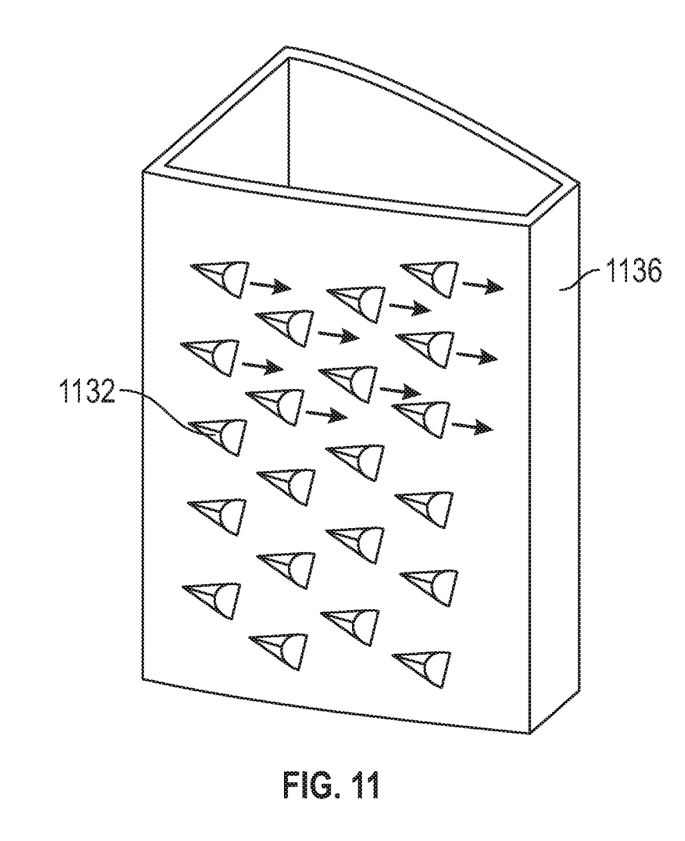
FIG. 11 is a schematic illustration of a baffle in accordance with an embodiment of the present disclosure.
Figure 12:
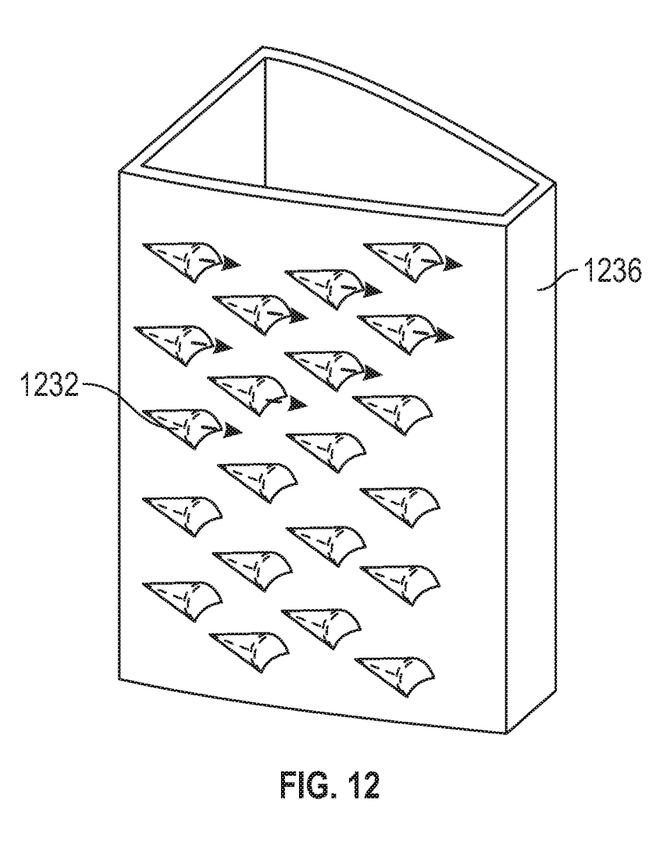
FIG. 12 is a schematic illustration of a baffle in accordance with an embodiment of the present disclosure.

Turning now to FIGS. 11-12, schematic illustrations of baffles 1136, 1236 are shown. FIG. 11 illustrates a baffle configuration having resupply covers 1132 that are partially-covering resupply covers 1132 that are positioned over resupply holes to shield and direct resupply air as the resupply air is injected into a hybrid skin core cooling cavity. FIG. 12 illustrates a baffle configuration having resupply covers 1232 that are fully-covering resupply covers 1232 that are positioned over resupply holes to shield and direct resupply air as the resupply air is injected into a hybrid skin core cooling cavity.

In accordance with embodiments of the present disclosure, the resupply covers can be directly integrated into the baffle design as positive features or may be welded, bonded, or otherwise attached to a surface of a baffle relative to resupply holes. In embodiments that incorporate the resupply covers to internal structural cold walls of an airfoil, the resupply covers can be integrally formed with the cold internal wall during airfoil formation.

As noted above, double-wall cooling configurations (e.g., hybrid skin core cooling cavity configurations) may be employed in various cooling design applications, such as, without limitation, for blades, vanes, blade outer air seals, combustor panels, mid-turbine frames, or other hot section engine components. Design concepts incorporating long $L/D_h$ hybrid cavities can employ boundary layer restart resupply geometry features, such as the resupply covers provided herein, to mitigate design challenges associated with large pressure loss, extreme cooling air temperature heat pickup, and reduction in heat transfer augmentation due to long $L/D_h$ fully developed flow fields.

It is to be understood by those skilled in the art that the boundary layer restart features (e.g., resupply holes, resupply covers, etc.) will be created or formed within the cold inner wall which separates the hybrid skin core cooling cavity from an internal cooling supply channel (e.g., cold cavity). The covered and/or partially covered resupply geometry shapes can be formed directly using metal powder base fusion additive manufacturing processes, or may be created by using additive manufacturing processes fabricated using ceramic alumina or silica core material from which conventional lost wax investment casting processes may be used to create single crystal blade, vane, blade outer air seal, or combustor panel cooling design configurations. Alternatively, the covered and/or partially covered resupply covers may be created using fugitive core manufacturing fabrication processes.

Although the various above embodiments are shown as separate illustrations, those of skill in the art will appreciate that the various features can be combined, mix, and matched to form an airfoil having a desired cooling scheme that is enabled by one or more features described herein. Thus, the above described embodiments are not intended to be distinct arrangements and structures of airfoils and/or core structures, but rather are provided as separate embodiments for clarity and ease of explanation.

Advantageously, embodiments provided herein are directed to airfoil cooling cavities having improved cooling features. Further, advantageously, improved part life, improved cooling, and reduced weight can all be achieved from embodiments of the present disclosure.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A component for a gas turbine engine, the component comprising:
   a hybrid skin core cooling cavity defined by a cold wall and a hot wall, wherein the hot wall is exposed to an exterior environment of the component;
   a hybrid resupply hole formed in the cold wall and fluidly connecting a cold cavity and the hybrid skin core cooling cavity; and
   a resupply cover located on the cold wall and within the hybrid skin core cooling cavity and positioned relative to the hybrid resupply hole to shield resupply air injected from the cold cavity into the hybrid skin core cooling cavity to minimize losses as the resupply air mixes with air flowing within the hybrid skin core cooling cavity,
   wherein the hybrid skin core cooling cavity includes a plurality of heat transfer augmentation features, and
   wherein the resupply cover has a geometry that is the same as a geometry of at least one of the plurality of heat transfer augmentation features, and
   wherein the resupply cover partially covers the hybrid resupply hole.

2. The component of claim 1, wherein the hot wall is an exterior wall of an airfoil and the cold wall is an interior wall of the airfoil.

3. The component of claim 2, wherein the cold wall is a wall of a baffle inserted into the airfoil.

4. The component of claim 1, wherein resupply cover fully covers the hybrid resupply hole.

5. The component of claim 1, wherein the plurality of heat transfer augmentation features are formed on the hot wall of the hybrid skin core cooling cavity.

6. The component of claim 1, wherein the resupply cover is integrally formed with the cold wall.

7. The component of claim 1, wherein the cold wall comprises a plurality of resupply holes and a plurality of resupply covers, wherein each resupply hole is shielded by a respective resupply cover.

8. The component of claim 1, wherein the resupply cover has a resupply cover height h in a direction from the cold wall toward the hot wall and the hybrid skin core cooling cavity has a hybrid skin core cooling cavity height H between the cold wall and the hot wall, and wherein $0.01 \leq h/H \leq 0.5$.

9. A gas turbine engine comprising:
   a component having a hybrid skin core cooling cavity defined by a cold wall and a hot wall, wherein the hot wall is exposed to an exterior environment of the component;
   a hybrid resupply hole formed in the cold wall and fluidly connecting a cold cavity and the hybrid skin core cooling cavity; and
   a resupply cover located on the cold wall and within the hybrid skin core cooling cavity and positioned relative to the hybrid resupply hole to shield resupply air injected from the cold cavity into the hybrid skin core cooling cavity to minimize losses as the resupply air mixes with air flowing within the hybrid skin core cooling cavity,
   wherein the resupply cover has a resupply cover height h in a direction from the cold wall toward the hot wall and the hybrid skin core cooling cavity has a hybrid skin core cooling cavity height H between the cold wall and the hot wall, and wherein $0.01 \leq h/H \leq 0.5$.

10. The gas turbine engine of claim 9, wherein the component is one of a blade, a vane, a blade outer air seal, or a combustor panel.

11. The gas turbine engine of claim 9, wherein the hot wall is an exterior wall of an airfoil and the cold wall is an interior wall of the airfoil.

12. The gas turbine engine of claim 11, wherein the cold wall is a wall of a baffle inserted into the airfoil.

13. The gas turbine engine of claim 9, wherein the resupply cover partially covers the hybrid resupply hole.

14. The gas turbine engine of claim 9, wherein the hybrid skin core cooling cavity includes a plurality of heat transfer augmentation features.

15. The gas turbine engine of claim 14, wherein the resupply cover has a geometry that is the same as a geometry of at least one of the plurality of heat transfer augmentation features.

16. The gas turbine engine of claim 9, wherein:
    the hot wall is an exterior wall of an airfoil,
    the cold wall is an interior wall of the airfoil, and
    the exterior environment is a gas path of the gas turbine engine.

17. The gas turbine engine of claim 9, wherein the resupply cover fully covers the hybrid resupply hole.

18. A component for a gas turbine engine, the component comprising:
    a hybrid skin core cooling cavity defined by a cold wall and a hot wall, wherein the hot wall is exposed to an exterior environment of the component;
    a hybrid resupply hole formed in the cold wall and fluidly connecting a cold cavity and the hybrid skin core cooling cavity; and
    a resupply cover located on the cold wall and within the hybrid skin core cooling cavity and positioned relative to the hybrid resupply hole to shield resupply air injected from the cold cavity into the hybrid skin core cooling cavity to minimize losses as the resupply air mixes with air flowing within the hybrid skin core cooling cavity,
    wherein the resupply cover has a resupply cover height h in a direction from the cold wall toward the hot wall and the hybrid skin core cooling cavity has a hybrid skin core cooling cavity height H between the cold wall and the hot wall, and wherein $0.01 \leq h/H \leq 0.5$.

19. The component of claim 18, wherein the hot wall is an exterior wall of an airfoil and the cold wall is an interior wall of the airfoil.

* * * * *